May 17, 1932.    N. DESIRELLO    1,858,361
OPTICAL DEVICE FOR RESOLVING AND COMBINING LIGHT RAYS
Filed Sept. 7, 1927
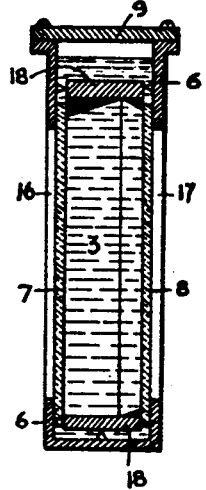
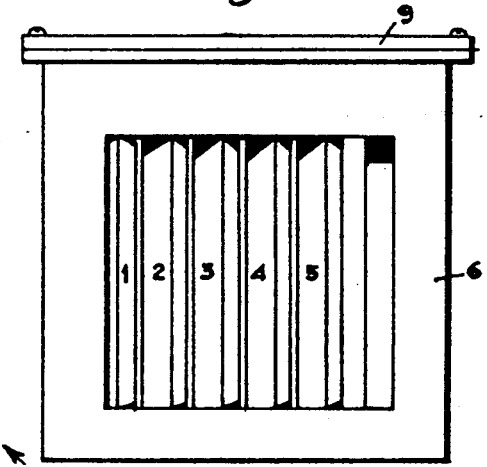
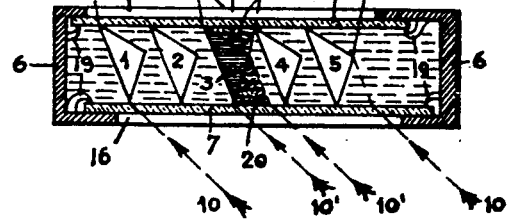
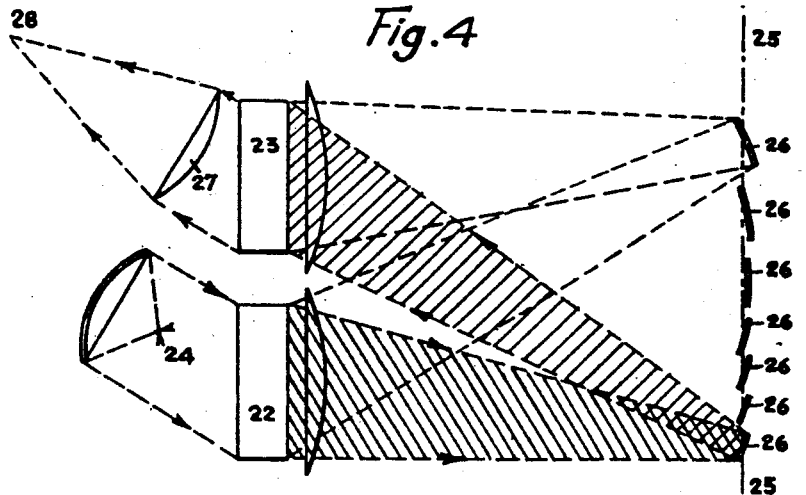
N. Desirello
INVENTOR
by Marks & Clark
ATTYS Patented May 17, 1932

1,858,361

UNITED STATES PATENT OFFICE

NARCISO DESIRELLO, OF GENOA-RIVAROLO, ITALY

OPTICAL DEVICE FOR RESOLVING AND COMBINING LIGHT RAYS

Application filed September 7, 1927, Serial No. 218,086, and in Germany September 7, 1926.

This invention relates to an optical device adapted to concentrate all the radiations from a source of light simultaneously in one focus.

The invention consists of two prism members combined together with a specular axis of symmetry and each formed by a set of composite prism elements arranged parallel with each other, one prism member decomposing the radiations of the spectrum and the other reversing the action of the first so as to recompose the whole spectrum accurately and obtain one focus simultaneously for all the radiations, the arrangement being completed by the known auxiliary elements such as lenses, prisms and mirrors for directing and deflecting the rays of light as required in the arrangement.

An embodiment of the invention in which each composite prism element is formed of three prisms arranged in series is shown in the accompanying drawings, in which:

Fig. 1 is a cross sectional view of a prism member.

Fig. 2 is a front view of the same.

Fig. 3 is a plan view of the same in section.

Fig. 4 is a diagrammatic arrangement showing the manner in which the two prism members are combined to form the optical device according to the invention.

In these figures, 6 is a metal rectangular casing with two opposite openings 16 and 17 which can be closed by glass plates 7 and 8 respectively. 9 is the cover of the casing. The casing is filled with a liquid having a high optical dispersion. In the liquid are immersed the prisms of crown glass 1, 2, 3, 4, 5 having a small optical dispersion relatively to that of the liquid. The prisms of crown glass have all the same triangular cross section and are positioned in the casing so as to have their corresponding faces parallel with each other; the prisms being of relatively great height, with respect to their triangular section. 10'—10' indicate the parallel incident rays of white light; 12, 13, 14, 15 indicate the rays after they have been refracted by the prisms; 12 indicates the direction of the red rays and 15 the direction of the violet rays whilst the rays of intermediate colours are not indicated. 11 indicates the direction of a ray of white light which has been able to pass between the prisms without encountering them, this ray leaves the prisms in its original direction 10 and does not in fact disturb the bundle of colors produced by the whole of the composite prism member. 18 is a metallic frame which serves to keep the crown glass prisms in place. Stops 19 are provided for keeping in place the glass plates 7 and 8 which close the rectangular openings 16 and 17. In Figure 3 the heavy lines indicated at 20 and 21 show in section two portions of the liquid which constitute prisms arranged in series with the prism of crown glass 3.

The optical dispersion of the liquid chosen is high and that of the crown glass small, and in general the refractive index of the liquid will be substantially different from that of the glass.

The working of the composite prism is as follows:

We will consider a portion of the parallel rays of white light indicated by the lines 10'—10', Figure 3, which reach the composite prism in an inclined direction. These rays enter the prism of liquid 20 which has a high optical dispersion, and are divided in the prism of crown glass 3 into the different colours. The glass prism 3 arranged the opposite way tends to diminish the optical dispersion produced by the prism 20, but as its optical dispersion is small, it leaves the rays almost unchanged and brings them to the liquid prism 21 which increases the optical dispersion and causes the rays to pass through the second opening in the composite prism in the form of wide beam 13—14 having a direction approximately perpendicular to the glass plate 8. As the materials and the angles of the faces of the composite prism 20, 3 and 21 are conveniently selected, a substantial optical dispersion is obtained and at the same time the prism 3 works without disturbing the similar working of the other similar prism elements 1, 2, 4, 5 as will easily be seen from Figure 3.

The prism 3 with the liquid 20 in front of it and the liquid 21 behind it forms in fact a composite prism element.

The composite prism elements 1, 2, 3, 4, 5 form a set of such elements which are arranged parallel with each other and together form a prism member. In the form of construction shown in the drawings the number of composite prism elements arranged in parallel to form the set is five and the number of prisms arranged in series to form each element is three.

The number of elements in each set may vary according to the luminous capacity to be obtained, and the number of prisms in each element may also vary, three being the number which presents the least difficulty of practical construction and the least cost.

It is not necessary for the white rays entering the prism to have the inclined direction indicated in Figure 3 and the leaving beam to have a middle direction which is perpendicular to the face of the prism: other directions may also be selected.

It must be noted that it is the essential difference between the refractive indices of the liquid and the crown glass which renders it possible for the white rays entering the prism in an inclined direction to leave it in a direction which is approximately normal to the exit surface. If the refractive indices were the same the angle of incidence of the entering ray would be the same as the angle formed by the leaving face of the prism with the middle direction of the leaving bundle of rays.

In the form shown in the drawings the two glass plates which close the openings in the case enclosing the prism member are parallel with each other, but the prism can also work if these faces are conveniently inclined.

The liquid adopted may be a pure liquid, or a mixture, or a solution; it may also be utilized combined with means for cooling the glass. There is nothing to prevent the prism from being composed of a series of elements such as 3, 20, 21 made entirely from glass. It is essential however for all the prism elements in the combined arrangement to be of the same conformation. The faces of the prism member instead of being plane ones could also be made with stepped surface.

The prism member formed by the set of composite prism elements is reversible; that is to say it can serve for decomposing light into its elementary colours, or it may recompose the said colours which may, for example, be obtained from another alike prism with one direction and in one beam containing all or a part of the colours.

With the materials conveniently selected the prism member so constructed may also be adopted for ultra-red and ultra-violet rays and for special parts of the visible or non-visible spectrum.

The optical device illustrated in Fig. 4 is adapted to concentrate all the radiations of the spectrum simultaneously in one focus; the same is formed of two similar prism members which are combined to work in series so that the first prism member 22 decomposes the rays coming from the lamp 24 with parabolic mirror in the spectrum upon the focal line 25; the second prism 23 receives the rays reflected from the mirrors 26 so as to recompose them and to concentrate them, by means of the lens 27, preferably achromatic, in the fixed focus 28. In Figure 4 the two prisms are shown one at the side of the other, but in the practical constructions it is advisable to arrange one above the other in order to prevent unnecessary aberrations.

In general the liquid will have a refractive index substantially different from that of the prisms of crown glass.

In order to obtain a clear spectrum without aberrations across a single prism, it is necessary for the entering beam of light to have an angle of incidence equal to the exit angle, that is to say the prism must present an axis of symmetry. Under these conditions the image of the light source is obtained in the spectrum. If the prism does not present such an axis of symmetry, the image is deformed, especially on account of its great dispersion. In the system of prisms according to the present invention the prism members 22 and 23 have no axis and no plane of symmetry and each produces, on account of its great dispersion, an enormous focal aberration. As the two prism members are combined in series they present, so to speak, a plane of specular symmetry upon the focal line 25 and they can produce at 28 the same focal image of the source of light for any ray of the spectrum.

It is understood that the same optical system will also work if the mirrors 26 are replaced by a row of conveniently constructed prisms and if the prism 23 is placed at the opposite side of the focal line 25 with respect to the prism 22.

The optical system according to the present invention may be employed for luminous radiations for ultra-red or ultra-violet radiations, by conveniently selecting the materials of the optical system so as to be transparent to the radiations employed.

Generally speaking, the optical system according to the present invention as well as the sets of composite prism elements, may be adopted for artistic, commercial, industrial, physiological, chemical, physical, electrical, catalytical uses and so on.

I claim:

1. Optical device for resolving and combining light rays, comprising a first prism member on which the composite parallel rays from a source of radiation impinge, a first converging lens arranged with its plane substantially parallel to the first composite prism and on which the single unicolor ray pencils leaving said composite prism impinge on different angles and are concentrated in separate focal points along a line substantially parallel to the optical plane of the prism element, a set of concave mirrors along the said focal line and deflecting the said rays against a second converging lens arranged with its optical plane within the plane of the first named lens, a second composite prism member arranged behind the second lens formed as the first one and complanar thereof, on which the light pencils from the second lens impinge and a further converging lens arranged rearwardly of the second prism member and concentrating the recomposed spectral pencils in a single focus.

2. Optical device for resolving and combining spectral rays comprising a first prism member on which the composite parallel rays from a source of radiation impinge and constituted of a set of like prisms made of glass of very low dispersive power and relatively low refractive power and immersed side-by-side in a transparent vat containing a liquid possessing both high refractive and dispersive power, a first converging lens arranged with its focal plane substantially parallel to the first composite prism and on which the single unicolor ray pencils leaving said composite prism impinge on different angles and are concentrated in separate focal points along a line substantially parallel to the optical plane of the prism element, a set of concave mirrors along the said focal line and deflecting the said rays against a second converging lens arranged with its optical plane within the plane of the first named lens, a second composite prism member formed as the first one and complanar thereof, on which the light pencils from the second lens impinge and a further converging lens arranged rearwardly of the second prism member and concentrating the recomposed spectral pencils in a single focus.

In testimony whereof I have signed my name to this specification.

NARCISO DESIRELLO.